United States Patent
Liu et al.

(10) Patent No.: US 7,444,081 B2
(45) Date of Patent: Oct. 28, 2008

(54) OPTICAL TRANSPORT SYSTEM

(75) Inventors: Samuel Xing Liu, San Jose, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 504 days.

(21) Appl. No.: 10/944,327

(22) Filed: Sep. 17, 2004

(65) Prior Publication Data

US 2006/0062581 A1   Mar. 23, 2006

(51) Int. Cl.
*H04B 10/00* (2006.01)

(52) U.S. Cl. .................. 398/138; 398/183; 398/201

(58) Field of Classification Search ............ 398/60, 398/135–139, 147–148
See application file for complete search history.

(56) References Cited

U.S. PATENT DOCUMENTS

| | | | | |
|---|---|---|---|---|
| 5,185,736 | A * | 2/1993 | Tyrrell et al. | 370/358 |
| 5,926,303 | A * | 7/1999 | Giebel et al. | 398/117 |
| 6,078,596 | A * | 6/2000 | Wellbrock | 370/352 |
| 2004/0062228 | A1 * | 4/2004 | Wu | 370/351 |

* cited by examiner

*Primary Examiner*—Dzung D Tran
(74) *Attorney, Agent, or Firm*—Conley Rose, P.C.; Grant Rodolph

(57) ABSTRACT

A method and system is disclosed to optically transport data at a data rate of about 5 Gbps without chromatic dispersion compensation. After receiving a first data stream at a data rate of about 2.5 Gbps and a second data stream at a data rate of about 2.5 Gbps, the first and second data streams are combined into a third data stream at a data rate of about 5 Gbps by interleaving the first data stream and the second data stream, wherein the third data stream is modulated for optically transporting the same from a transmission end.

21 Claims, 6 Drawing Sheets

OPTICAL TRANSPORT SYSTEM

BACKGROUND

The present invention relates generally to fiber-optic transport systems, and more particularly to methods to optically transport data at a data rate of about 5 Gbps without chromatic dispersion compensation.

Telecommunications carriers and equipment vendors have a common business goal: to increase their optical transport efficiency while using the minimum amount of optical fiber resources. In the last two decades, Synchronized Optical Networks (SONET) in US and Japan, as well as Synchronous Digital Hierarchy (SDH) in the rest of the world, have dominated the optical transport layer with data rate increased from 155 Mbps (OC-3/STM-1), 622 Mbps (OC-12/STM-4) and 2.5 Gbps (OC-48/STM-16) to 10 Gbps (OC-192/STM-64). 40 Gbps (OC-768/STM-256) SONET/SDH data rates are expected to be realized in the near future. When the SONET/SDH standard was created, 5 Gbps was defined as OC-96/STM-32. However, due to economic reasons, equipment vendors and carriers have skipped the OC-96/STM-32 optical transport solution and transitioned directly to OC-192/STM-64 rates. As such, no OC-96/STM-32 optical transport systems have been realized to date. However, a 5 Gbps non-SONET optical transport system may be a viable alternative to the OC-48/STM-16 2.5 Gbps and OC-192/STM-64 10 Gbps SONET optical transport systems.

In the mid 1990s, Dense Wavelength Division Multiplexing (DWDM) arrived to further increase the optical transport efficiency by combining multiple optical signals (at present up to 160 channels) onto one fiber cable, thereby increasing the transport efficiency. Typically, the implementation cost of an optical solution with higher throughput does not increase proportionally with the increase in transport efficiency. Therefore, the per-bit cost decreases with a higher throughput transport system. As the Internet rapidly expands and the amount of data traffic skyrockets, Gigabit Ethernet (GE) channels are increasingly being aggregated into SONET/SDH for long distance transport. As an example, SONET/SDH optical transport systems are increasingly using the OC-192/STM-64 data rates which, as expected, have bandwidth efficiency that is better than OC-48/STM-16 for the transport of multiple GE channels.

A typical metropolitan area (metro) or long haul optical transport application transmits optical signals through a few hundred kilometers, and even through a few thousand kilometers sometimes. When the optical data rate increases above 2.5 Gbits, chromatic dispersion becomes a major concern for the performance of the long distance optical transport. As a result of the chromatic dispersion effect, substantial additional costs for the transport system are incurred above the 2.5 Gbps data rate. The chromatic dispersion effect is caused by the different travel velocities of the various optical signal spectrum components. Chromatic dispersion significantly broadens the signal pulses which severely limits the signal detection capability of the optical receiver.

For example, a standard single mode fiber (SMF) has a chromatic dispersion of 17 ps/nm per kilometer (km) at an optical wavelength of 1550 nm. The spectral width of a chirp-free optical signal is approximately equal to the inverse of the minimum pulse duration, or the equivalent of the data rate. Therefore, for a non-return-to-zero (NRZ) binary signal at 10 Gbps, where the minimum pulse duration is 100 ps, the spectral width is approximately 0.08 nm. A 70-km transmission distance of a 10 Gbps signal in a standard single mode fiber leads to a cumulative dispersion of 1200 ps/nm. Thus, the signal pulse broadens by approximately 100 ps, which is about one bit period. Thus the dispersion-limited transmission distance of a chirp-free 10 Gbps NRZ optical signal is about 70 km in SMF. For a NRZ binary signal at 2.5 Gbps, where the minimum pulse duration is 400 ps, the spectral width is approximately 0.02 nm. Under this condition, the signal pulse broadens by approximately 400 ps due to the cumulative dispersion, the dispersion-limited transmission distance can be reverse-calculated to be 1000 km for a 2.5 Gbps NRZ optical signal. For a NRZ binary signal at 5 Gbps, where the minimum pulse duration is 200 ps, the spectral width is approximately 0.04 nm. After a 300-km transmission of the 5 Gbps signal in a standard single mode fiber, a cumulative dispersion of 5000 ps/nm is incurred. The signal pulse broadens by approximately 200 ps, which is about one bit period. Thus, the dispersion-limited transmission distance of a chirp-free 5 Gbps NRZ optical signal is about 300 km in SMF. In summary, as the optical signal data rate increases from 2.5 Gbps to 5 Gbps to 10 Gbps, the dispersion limited transmission distance decreases from 1000 km to 300 km to 70 km respectively. Dispersion compensating techniques at the higher data rates are needed for longer transmission distances.

For longer distance optical transport, dispersion compensation is required. Dispersion compensating fiber (DCF), which exhibits a negative chromatic dispersion, is the standard method for compensating fiber dispersion. A segment of DCF could be inserted in the transmission line after each fiber span between the multiple stages of optical amplification. The negative dispersion value of the DCF required at each node is equal to the cumulative fiber dispersion at that node. At the end of the total transmission span, the cumulative total dispersion should be an optimal value where the distortion of the signal is minimal. For the linear transmission of chirp-free signals, the cumulative total dispersion optimal value is zero.

Metro applications using the 10 Gbps data rate encounter this dispersion compensation issue. The use of DCF would make the metro area networks both inflexible and expensive. It is very difficult, if not impossible, to uniformly compensate the chromatic dispersion at each node using DCF since there will be several nodes with multiple add/drop channels. The current 2.5 Gbps data rate used for metro applications does not provide sufficient bandwidth efficiency. As previously discussed, the 5 Gbps metro optical transport could support up to 300 km transmission distances without dispersion compensation while increasing bandwidth efficiency. It seems that this data rate is a good compromise for metro optical transport.

When compared to a 2.5 Gbps transport system, the 5 Gbps non-SONET optical transport system is a superior transport system choice to maximize data traffic transport efficiency. Similarly, the 5 Gbps non-SONET optical transport system minimizes the chromatic dispersion issue typically found in any 10 Gbps transport system. Another advantage of a 5 Gbps non-SONET optical transport system over a conventional SONET/SDH transport system is its ability to support two OTU1 channels, each of which could carry two Gigabit Ethernet channels.

Therefore, desirable in the art of fiber-optic data transport systems are improved fiber-optic transport systems for both long haul and metropolitan applications that provide increased data transport efficiency and lower SMF chromatic dispersion, with minimal optical fiber resources and at a lower cost per bit.

SUMMARY

In view of the foregoing, in several embodiments illustrated below, a method and system is implemented to optically transport data at a data rate of about 5 Gbps without chromatic dispersion compensation. After receiving a first data stream at a data rate of about 2.5 Gbps and a second data stream at a data rate of about 2.5 Gbps, the first and second data streams are combined into a third data stream at a data rate of about 5 Gbps by interleaving the first data stream and the second data stream, wherein the third data stream is modulated for optically transporting the same from a transmission end.

The construction and method of operation of the invention, however, together with additional objects and advantages thereof will be best understood from the following description of specific embodiments when read in connection with the accompanying drawings.

DESCRIPTION

The present invention provides methods and systems for optically transporting data at a data rate of about 5 Gbps without chromatic dispersion compensation.

Figure 1:
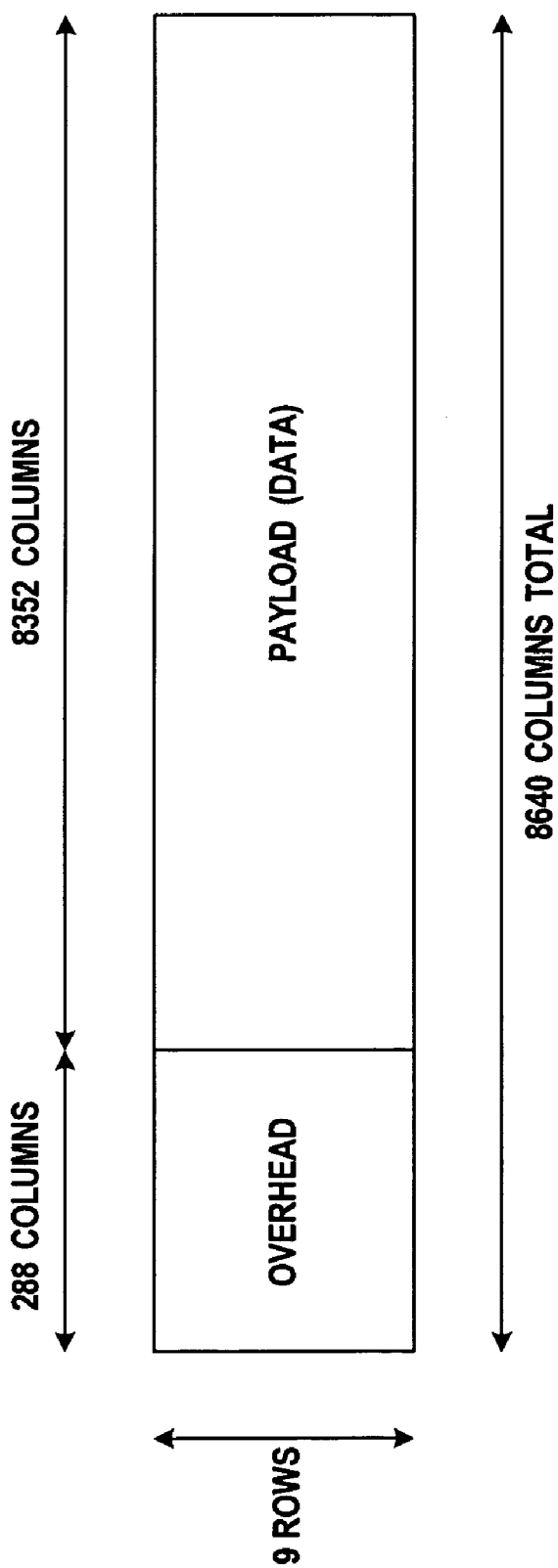
FIG. 1 presents a conventional frame structure standard.

FIG. 1 presents the OC-96/STM-32 frame structure standard. In this standard, an OC-96/STM-32 frame, which contains 8640 total columns by 9 rows, includes a transport overhead (TOH) section of 288 columns by 9 rows and a payload section of 8352 columns by 9 rows. The TOH section has framing, performance monitoring, pointers, alarms and other Operations, Administration, Maintenance and Provisioning (OAM&P) information relevant to the frame. It is understood by those skilled in the art that the OC-96/STM-32 frame has twice the TOH and payload information of an OC-48/STM-16 frame and one-half the TOH and payload information of an OC-192/STM-64 frame.

Figure 2:
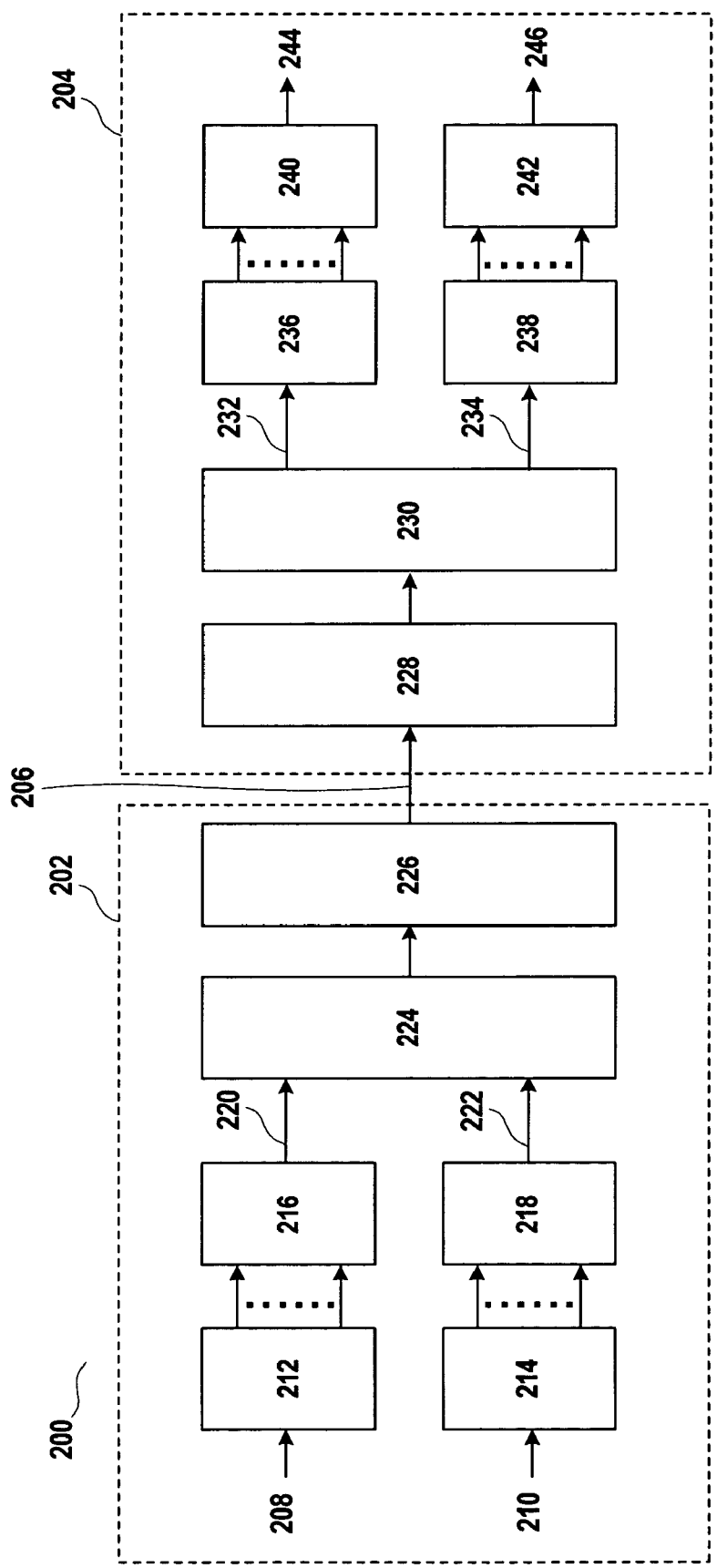
FIG. 2 presents a non-SONET optical transport system in accordance with a first embodiment of the present invention.

FIG. 2 presents a 5 Gbps non-SONET optical transport system 200 in accordance with a first embodiment of the present invention. The optical transport system 200 includes a 5 Gbps transmitter module 202 at a transmission end and a 5 Gbps receiver module 204 at a receiving end, to be interconnected by an optical fiber link 206. It is understood that while the 5 Gbps notation is used, the optical transport system 200 operates between 5 Gbps and 6 Gbps, or beyond, depending upon the lower speed signal type (e.g., SONET, SDH, OTU1 etc.).

The transmitter module 202 receives two 2.5 Gbps data streams 208 and 210, which are further and respectively received by two framers 212 and 214. It is understood that a 2.5 Gbps data stream can vary its speed from 2.488 Gbps to 2.667 Gbps, and similarly, other data rates mentioned in this disclosure (such as 1 Gbps) also represent their respective small range of data rates. The framers 212 and 214, which are SONET/SDH/OTU1 frames, respectively process the 2.5 Gbps data streams 208 and 210 to create framed data streams containing a plurality of information, including section overhead, line overhead, and data payload. The framers 212 and 214 then send the framed data streams to two converters 216 and 218, respectively to convert the framed data streams to two serial signals 220 and 222, respectively. The two converters 216 and 218 may be 2.5 Gbps parallel-to-serial and serial-to-parallel (SerDes) converters. The serial signals 220 and 222 are understood to exhibit a serial data rate of approximately 2.488 Gbps to 2.66 Gbps, depending upon the network transmission type (SONET, SDH, OTU1). It is further understood that each of the serial signals may have a slightly different data rate. The serial signals 220 and 222 are then sent to a 5 Gbps transceiver 224, which interleaves the two serial signals 220 and 222 together by either byte or bit interleaving. The byte and bit interleaving mechanism will be further explained in FIGS. 3 and 4. It is understood that the 5 Gbps transceiver 224 replaces traditional 5 Gbps SONET/SDH framers, mappers, and other SerDes-related components. After the two serial signals 220 and 222 are interleaved and converted to an electrical serial data stream having a data rate of 5 Gbps, the interleaved signal is received by an optical transmitter 226. The optical transmitter 226 converts the electrical serial data stream to an optical data stream that can be transported on the optical fiber link 206.

After the receiver module 204 receives the optical data stream through the optical fiber link 206, it serves to eventually extract the 2.5 Gbps data streams 208 and 210. An optical receiver 228 receives the optical data stream, recovers clock, and converts the optical data stream to an electrical serial data stream. For byte interleaving case, the transmitted frame boundaries must be identified to synchronize the optical receiver 228 with the transmitted information to exactly extract the proper data payload and overhead information. For bit interleaving case, the transmitted information is just a serial data stream of unintelligible information. Either an initial pre-programmed bit pattern could be used to establish bit/channel assignment or an external IC chip (e.g., FPGA, CPLD, ASIC, or microprocessor) could be used to identify bit/channel assignment. The electrical serial data stream is then sent from the optical receiver 228 to a 5 Gbps transceiver 230, which de-interleaves the electrical serial data stream into two serial signals 232 and 234, which should match the serial signals 220 and 222, respectively. The serial signals 232 and 234 are sent to two converters 236 and 238, where they are converted into framed data streams. For example, the converters 236 and 238 may be 2.5 Gbps SerDes converters. The framed data streams are then sent to two framers 240 and 242, which strip the overhead information and produce two 2.5 Gbps data streams 244 and 246. It is understood that the 2.5 Gbps data streams 244 and 246 are respectively identical to the 2.5 Gbps data streams 208 and 210. It is understood that for transmission of data from the receiving end to the original transmission end, a configuration reversing the roles of the modules 202 and 204 is required.

The optical transport system 200 can support 200 km to 300 km transmission distances without chromatic dispersion compensation in the optical domain. In comparison, 10 Gbps SONET/SDH optical transport systems typically require chromatic dispersion compensation after just 70 km, an effort which can be quite expensive and difficult to implement. Also, whereas a typical SONET/SDH system cannot support dual OTU1 channels, the optical transport system 200 can support dual OTU1 channels.

In this embodiment, commercially available 5 Gbps backplane transport chipsets are utilized to build the optical transport system 200. The system can be built on one board which includes both 202 and 203; or with a mother board/daughter board configuration, in which typically the transmitter 226 and receiver 228 will be in the optical transponder daughter board. Other embodiments may utilize other daughter board input/output modules, but the base 5 Gbps optical transport system remains unchanged. This design feature minimizes the impact for alternative embodiments and thereby minimizes costs.

The optical transport system 200 has the following advantages. The first advantage is the extended transmission range without chromatic dispersion compared to a typical 10 Gbps SONET/SDH transport system. This eliminates the expensive chromatic dispersion compensation techniques necessary in such a typical 10 Gbps SONET/SDH transport system. The second advantage is the greater bandwidth efficiency, when compared to the 2.5 Gbps transport system. The third advantage is that interleaving, either by bit or by byte, in this invention is much less expensive to implement than in a SONET/SDH-based system. As an example, SONET/SDH OC-96/STM-32 framers are not both commercially and widely available. The fourth advantage is that the optical transport system 200 supports dual OTU1 traffic, which is not supported by a typical SONET/SDH-based system. Finally, the performance of the optical transport system 200 is equal to or better than the SONET/SDH-based system.

Figure 3:
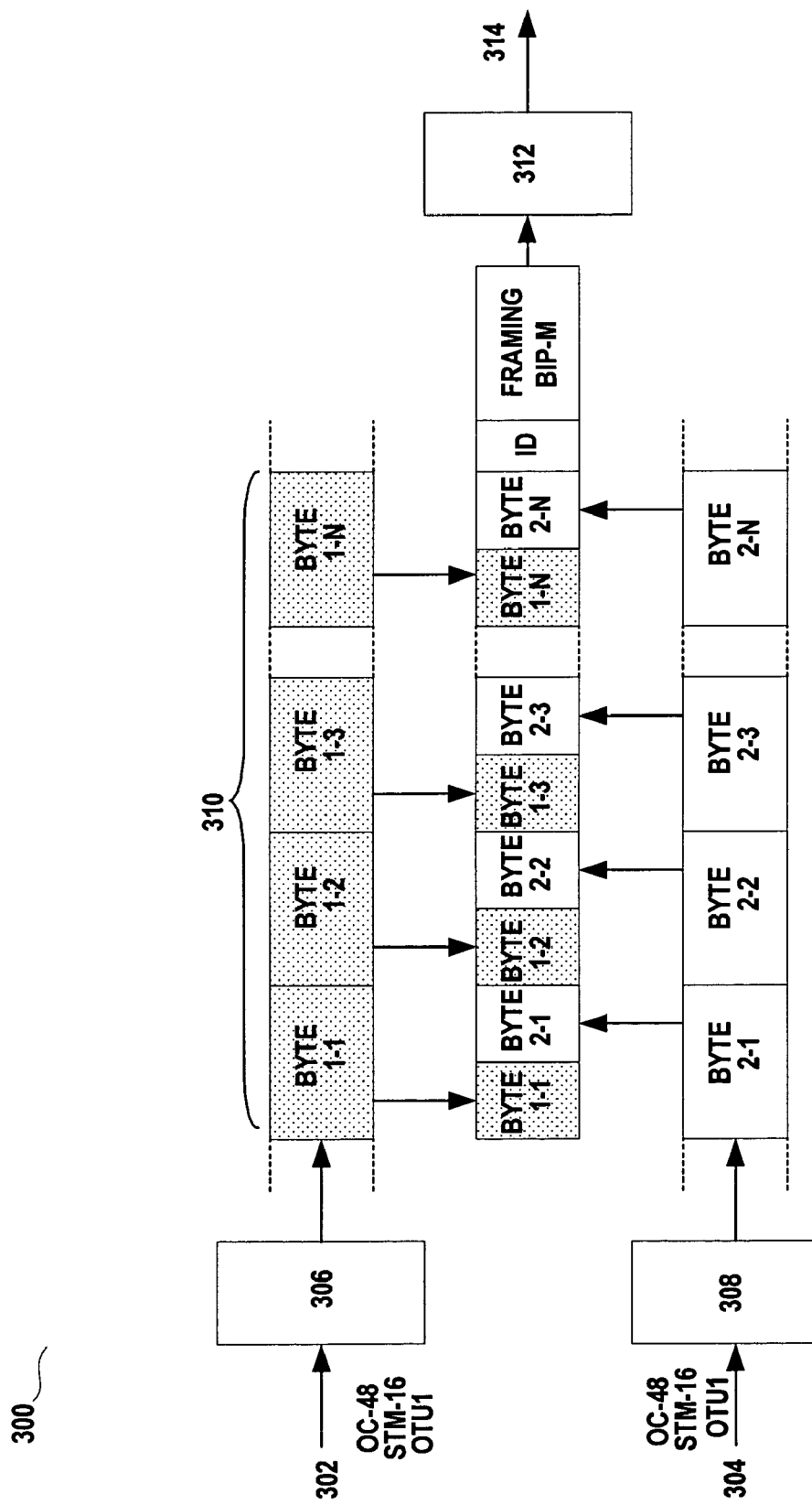
FIG. 3 presents a byte-interleaving flow in accordance with the first embodiment of the present invention.

FIG. 3 presents a byte-interleaving flow 300 in accordance with the first embodiment of the present invention. The flow 300 illustrates how two framed data streams are converted into a 5 Gbps optical frame at the transmission end. Two framed data streams 302 and 304, which are framed data streams of OC-48/STM-16/OTU1 data signals, are converted by two SerDes converters 306 and 308 into a set of electrical serial signals for byte-interleaving. This interleaving mechanism is shown in a section 310, where data bytes are interleaved. The interleaved signal is further attached with additional information bytes, including bytes for framing bit interleaving parity (BIP) codes and ID bytes. An optical serializer 312 frames the interleaved signal into an optical data stream 314 in the optical domain, which is then optically transmitted. With reference to both FIGS. 2 and 3, the flow 300 encompasses the functions of the converters 216 and 218, and the transceiver 224, and some functions of the optical transmitter 226, and can also be seen as a functional flow enabled by an embedded, predefined chipset for all framing, interleaving and serializing purposes.

To ensure that the receiving end, which may deploy one or more receiver modules 204, interprets this optical data stream correctly, an error-detecting mechanism must be implemented. A simple error detecting code can be utilized for this function, such as the BIP code. In traditional SONET/SDH systems, BIP-8 with even parity is utilized for error detection. In this invention, BIP-4 or BIP-8 could be utilized. The ID portion is a unique data pattern utilized by the receiving end to delineate the boundary of the transmitted frame. This is accomplished by continuously checking the ID pattern "K" times (where K is a long integer) to define the frame boundaries. When the frames are received and synchronized by the receiver modules 204, the bytes are de-interleaved and sent to the corresponding channels. All channel management and monitoring functions in byte-interleaving scenario could be implemented by processing the 2.5 Gbps level overhead in SONET/SDH/OTU1 or it could also be implemented in the 5 Gbps processing frames. It is understood that the SONET/SDH automatic protection system can be triggered by either of the 2.5 Gbps SONET/SDH framers by processing its overhead information.

Figure 4:
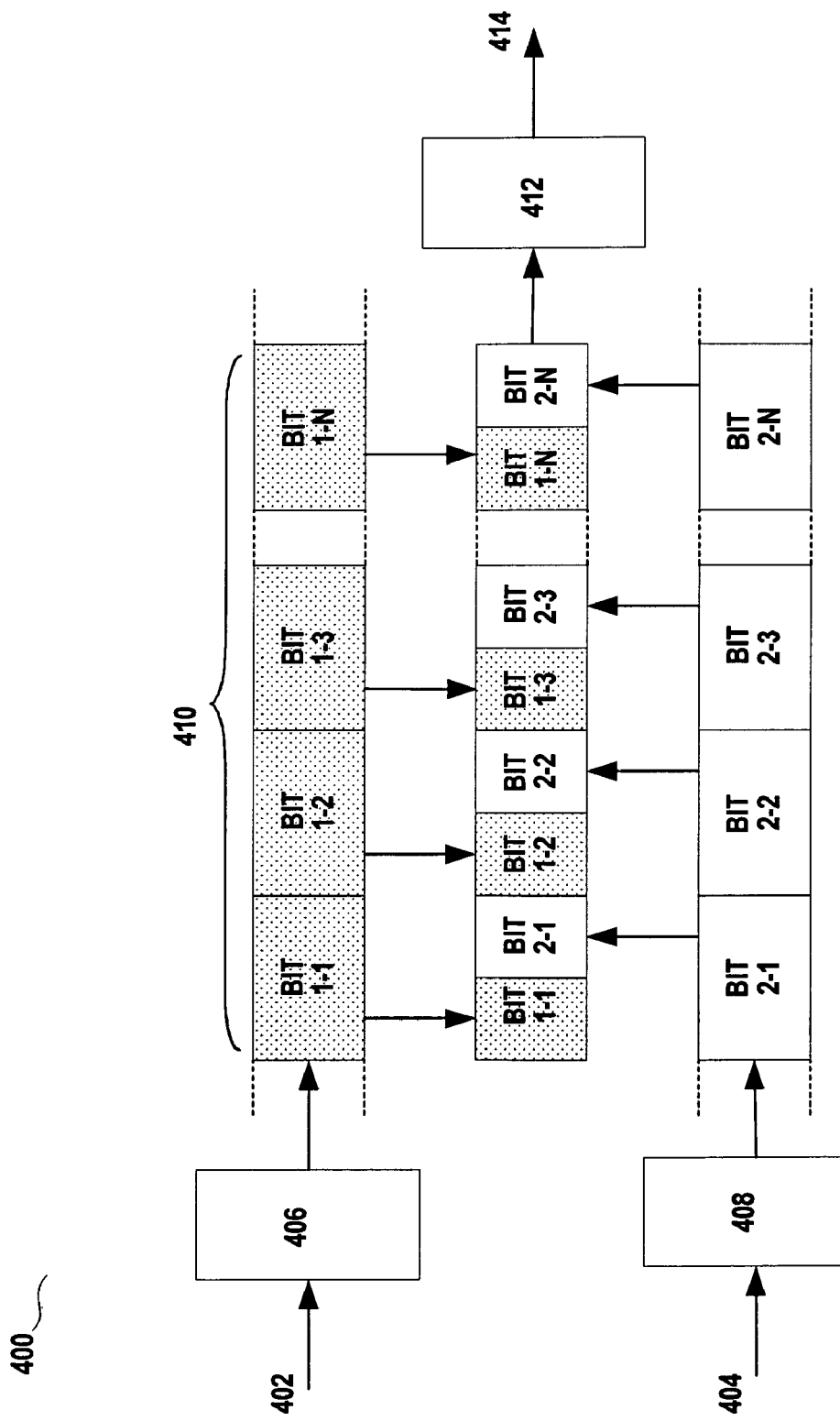
FIG. 4 presents a bit-interleaving flow in accordance with the first embodiment of the present invention.

FIG. 4 presents a bit-interleaving flow 400 in accordance with the first embodiment of the present invention. The flow 400 illustrates how two framed data streams are converted into a 5 Gbps optical frame at the transmission end. Two framed data streams 402 and 404, which are framed data streams of OC-48/STM-16/OTU1 data signals, are converted by two SerDes converters 406 and 408 into a set of electrical serial signals for bit-interleaving, which is performed in a section 410. The bit-interleaved output is a 5 Gbps composite bit-interleaved signal. An optical serializer 412 frames the bit-interleaved signal into an optical data stream 414 in the optical domain, which is then optically transmitted.

For bit-interleaving, all channel management and monitoring functions therein must be implemented by external processing, since the interleaved data stream does not contain information related to channel management and monitoring.

Figure 5:
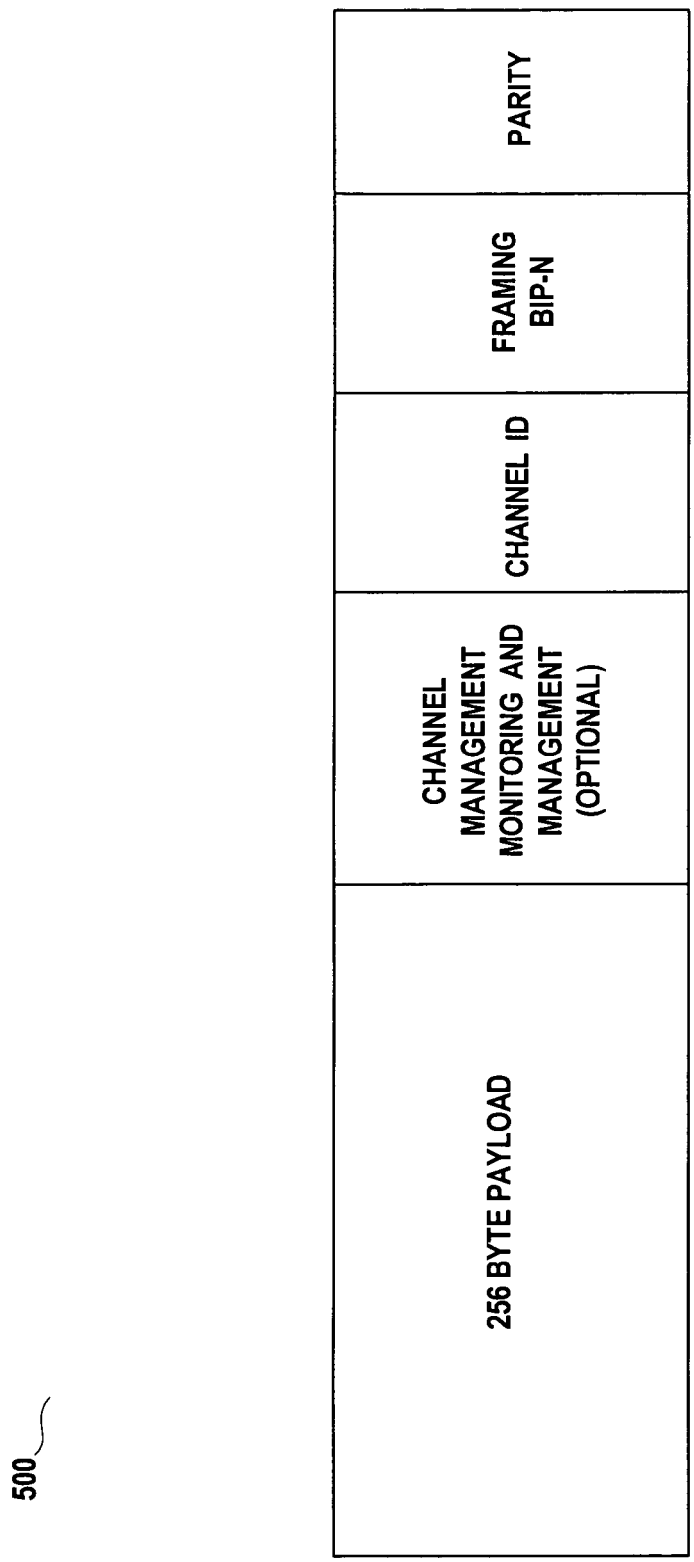
FIG. 5 presents a non-SONET byte interleaved frame structure in accordance with various embodiments of the present invention.

FIG. 5 presents a non-SONET byte interleaved frame structure 500 in accordance with various embodiments of the present invention. As shown, the frame structure 500 has a 256-byte payload, and header information comprising optional channel monitoring and management, channel ID, BIP codes, and parity error detection.

Figure 6:
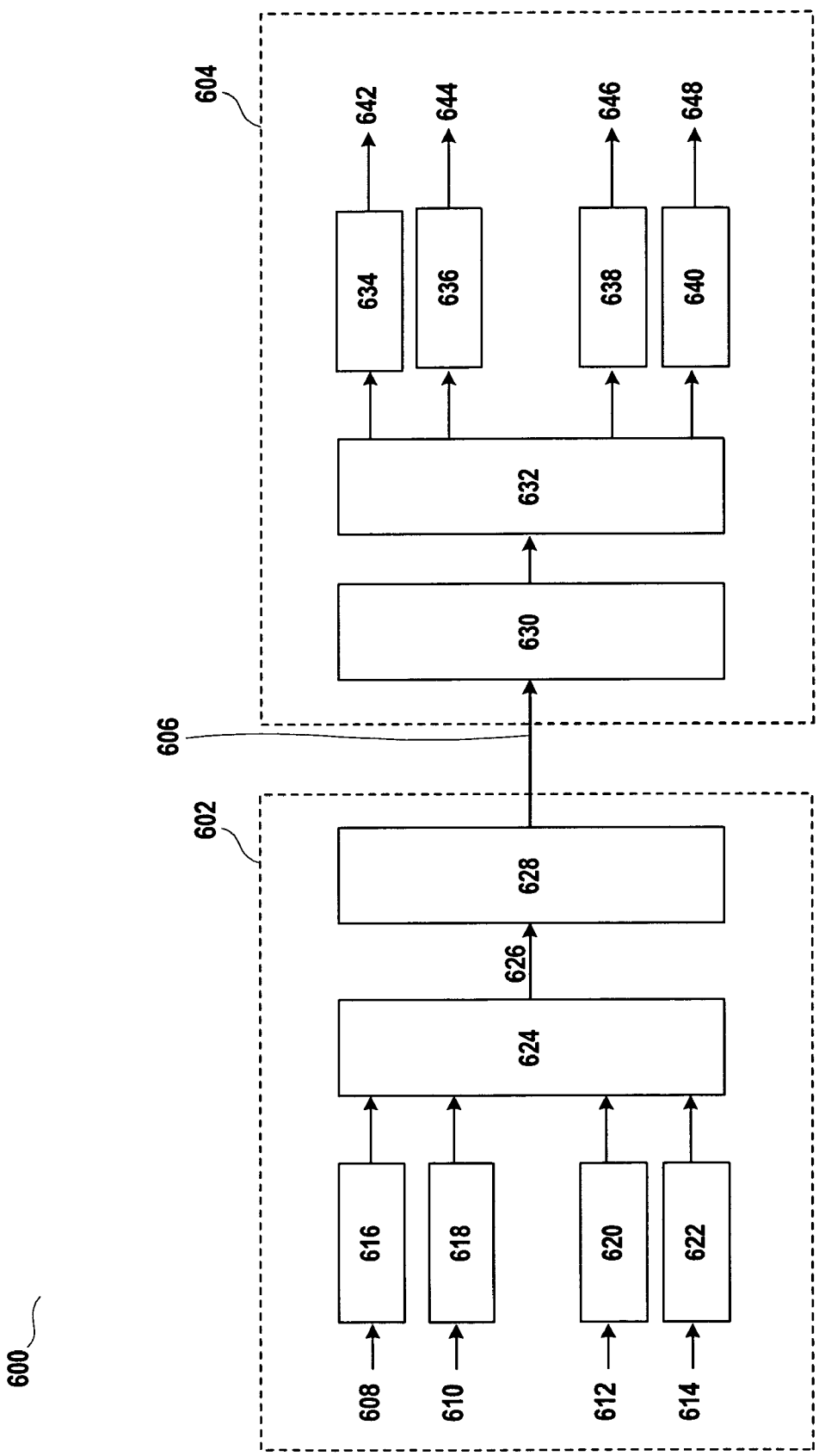
FIG. 6 presents a 5 Gbps non-SONET optical transport system in accordance with a second embodiment of the present invention.

FIG. 6 presents a 5 Gbps non-SONET optical transport system 600 in accordance with a second embodiment of the present invention. In this embodiment, four 1 Gbps (which varies from 1 Gbps to 1.25 Gbps) input data signals are interleaved and modulated into an optical signal for optical transmission. The optical transport system 600 includes a transmitter module 602 at a transmission end and a receiver module 604 at a receiving end, to be interconnected by an optical fiber link 606.

The transmitter module 602 receives four 1.0 Gbps data streams 608, 610, 612, and 614, which are inputted respectively to four framers 616, 618, 620, and 622. Each of the framers processes the 1.0 Gbps signals to create framed data streams containing section overhead, line overhead, and data payload. The framers then output the framed data streams to a SerDes transceiver 624 for parallel-serial conversion and interleaving. The functions of parallel-serial conversion and interleaving are combined for ease of illustration. An interleaved electrical serial data stream 626 is then sent from the SerDes transceiver 624 to an optical transmitter 628, which then converts the electrical serial data stream 626 into an optical data stream suitable for transport on the optical fiber link 606. The optical data stream, which is understood to exhibit a data rate of around 5 Gbps, has either a self-defined optical frame structure and frame boundaries with its unique overhead and payload structure in accordance with specific vendor designs and configurations or simply just bit interleaved to a 5 Gbps data steam.

At the receiving end, the receiver module 604 receives the optical data stream through the optical fiber link 606 and processes the data to exactly extract the four original 1.0 Gbps data streams 608, 610, 612, and 614. Specifically, an optical receiver 630 receives the optical data stream, recovers the clock, and converts optical data signal into an electrical serial data stream, which is received by a SerDes transceiver 632. It is understood that the receiver module 604 must identify the transmitted frame boundaries to synchronize itself with the transmitted information to exactly extract the proper data payload and overhead information. The same synchronization techniques as explained in the optical transport system 200 may be utilized. For ease of illustration, the SerDes transceiver 632 performs both serial-parallel conversion and de-interleaving, and outputs four framed data streams. The four framed data streams are inputted to four framers 634, 636, 638, and 640 to derive four 1.0 Gbps data streams 642, 644, 646, and 648, which are identical to the original 1.0 Gbps data streams 608, 610, 612, and 614. It is understood that for transmission of data from the receiving end to the original transmission end, a configuration reversing the roles of the modules 602 and 604 is required.

In this embodiment, the design has the same performance and cost advantages over the 2.5 Gbps and 10 Gbps as the first embodiment as illustrated in FIG. 2.

In this invention, a 5 Gbps non-SONET optical transport system provides improved data transport efficiency (when compared to a 2.5 Gbps SONET transport system) while minimizing the chromatic dispersion to allow greater span transmission lengths (when compared to a 10 Gbps SONET transport system) without dispersion compensation.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for optically transporting data without chromatic dispersion compensation, the method comprising:
receiving a first data stream at a data rate of about 2.5 Gbps;
receiving a second data stream at a data rate of about 2.5 Gbps;
framing the first data stream into a first framed data stream;
framing the second data stream into a second framed data stream; and
combining the first and second framed data streams into a third data stream at a data rate of about 5 Gbps by interleaving the first framed data stream and the second framed data stream,
wherein the combining is subsequent to the framing steps,
wherein the third data stream is modulated for optically transporting the same from a transmission end.

2. The method of claim 1 wherein the interleaving is done by a backplane transceiver.

3. The method of claim 1 wherein the combining further includes byte interleaving the first and second framed data streams.

4. The method of claim 3 wherein the byte interleaving uses an interleaved frame including one or more error checking sections.

5. The method of claim 4 wherein the interleaved frame further includes a channel ID section and a payload section.

6. The method of claim 5 wherein the interleaved frame further includes a channel monitoring and management section.

7. The method of claim 1 wherein the combining further includes bit interleaving the first and second framed data streams.

8. The method of claim 1 further comprising:
receiving the optically transported data at a receiving end;
demodulating the optically transported data into an electrical data stream at about 5 Gbps; and
reconstructing the first data stream and the second data stream at about 2.5 Gbps.

9. The method of claim 8 wherein the reconstructing further includes extracting the first framed data stream and the second framed data stream from the interleaved third data stream.

10. The method of claim 1 wherein the first and second framed data stream is of a format selected from a group consisting of OC-48, STM-16, and OTU1.

11. A method for optically transporting data without chromatic dispersion compensation, the method comprising:
receiving a plurality of incoming data streams at an original data rate lower than about 2.5 Gbps;
framing the plurality of data streams into a plurality of framed data stream; and
combining the plurality of framed data streams into an outgoing data stream at a data rate of about 5 Gbps by interleaving the framed data streams,
wherein the combining is subsequent to the framing,
wherein the outgoing data stream uses a non-SONET/SDH frame and is modulated for optically transporting the same over a long distance from a transmission end.

12. The method of claim 11 wherein the interleaving is done by a backplane transceiver.

13. The method of claim 11 wherein the interleaving uses a 2-to-1 interleaving ratio if there are two incoming data streams at a data rate of about 2.5 Gbps.

14. The method of claim 11 wherein the interleaving uses a 4-to-1 interleaving ratio if there are four incoming data streams at a data rate of about 1 Gbps.

15. The method of claim 11 wherein the interleaving uses an interleaved frame including one or more error checking sections, a channel ID section and a payload section.

16. The method of claim 15 wherein the interleaved frame further includes a channel monitoring and management section.

17. The method of claim 11 further comprising:
receiving the optically transported data at a receiving end;
demodulating the optically transported data into an electrical data stream at about 5 Gbps, and
reconstructing a plurality of data streams at the original data rate.

18. A system for optically transporting data using a 5 Gbps transport rate without chromatic dispersion compensation, the system comprising:
a first framer for receiving and framing a first data stream;
a first converter for transporting the framed first data stream at an original data rate of about 2.5 Gbps;
a second framer for receiving and framing a second data stream;
a second converter for transporting the framed second data stream at an original data rate of about 2.5 Gbps; and
a 5 Gbps transceiver for combining the first and second framed data streams into a third data stream at a data rate of about 5 Gbps by interleaving the first framed data stream and the second framed data stream, an optical transmitter for modulating the third data stream for optically transporting the same over a long distance from a transmission end to a receiving end wherein the first and second data streams are framed before the first and second framed data streams are combined into the third data stream.

19. The system of claim 18 wherein the first and second converters are 2.5 Gbps serializer-deserializer (SerDes).

20. The system of claim 18 wherein the 5 Gbps transceiver is a 5 Gbps SerDes.

21. The system of claim 18 wherein the first and second framer frame the first and second data streams respectively using OC-48, STM-16 or OTU1 format.

* * * * *